United States Patent
Göres et al.

(10) Patent No.: US 6,583,238 B1
(45) Date of Patent: Jun. 24, 2003

(54) CATALYST SYSTEM, METHOD FOR THE PRODUCTION THEREOF, AND THE UTILIZATION THEREOF FOR THE POLYMERIZATION OF OLEFINS

(75) Inventors: Markus Göres, Eschborn (DE); Hans Bohnen, Moers (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 09/646,177

(22) PCT Filed: Mar. 17, 1999

(86) PCT No.: PCT/EP99/01733

§ 371 (c)(1),
(2), (4) Date: Sep. 14, 2000

(87) PCT Pub. No.: WO99/50312

PCT Pub. Date: Oct. 7, 1999

(30) Foreign Application Priority Data

Mar. 27, 1998 (DE) .......................................... 198 13 657

(51) Int. Cl.$^7$ .................................................. C08F 4/44
(52) U.S. Cl. ....................... 526/127; 526/129; 526/160; 526/161; 526/943; 526/113; 502/103; 502/117; 502/152; 502/162
(58) Field of Search ................................. 526/127, 129, 526/160, 161, 113, 943; 502/103, 117, 152, 162

(56) References Cited

U.S. PATENT DOCUMENTS 5,585,509 A    12/1996   Langhauser et al.
5,770,753 A    6/1998    Kueber et al.
5,786,432 A    7/1998    Kueber et al.
5,840,644 A  * 11/1998   Kuber et al. ................. 502/117

FOREIGN PATENT DOCUMENTS

| CA | 2093056 | 10/1993 |
|---|---|---|
| EP | 563 917 | 10/1993 |
| EP | 576 970 | 1/1994 |

* cited by examiner

*Primary Examiner*—David W. Wu
*Assistant Examiner*—William Cheung
(74) *Attorney, Agent, or Firm*—Keil & Weinkauf

(57) ABSTRACT

A catalyst system with at least one specifically substituted metallocene which contains a cationic group as a substituent, a process for preparing such a catalyst system and its use in the polymerization of olefins. In particular, said catalyst system has (a) at least one support, (b) at least one cocatalyst and (c) at least one metallocene of the formula

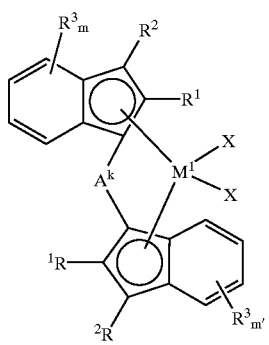

where $M^1$, $R^1$, $R^2$, $R^3$, m, m', A, k and X are defined herein.

8 Claims, No Drawings

CATALYST SYSTEM, METHOD FOR THE PRODUCTION THEREOF, AND THE UTILIZATION THEREOF FOR THE POLYMERIZATION OF OLEFINS

The present invention relates to catalyst systems comprising specifically substituted metallocenes which can advantageously be used in olefin polymerization and to a process for preparing them and also to their use in the polymerization of olefins.

Processes for preparing polyolefins with the aid of soluble, homogeneous catalyst systems comprising a transition metal component of the metallocene type and a cocatalyst component such as an aluminoxane, a Lewis acid or an ionic compound are known. These catalysts have a high activity and give polymers and copolymers having a narrow molar mass distribution.

In polymerization processes using soluble, homogeneous catalyst systems, thick deposits form on reactor walls and stirrer if the polymer is obtained as a solid. These deposits are always formed by agglomeration of the polymer particles when metallocene and/or cocatalyst are present in dissolved form in the suspension. Such deposits in the reactor systems have to be removed regularly, since they rapidly reach considerable thicknesses, have a high strength and prevent heat transfer to the cooling medium. Such homogeneous catalyst systems cannot be used industrially in modern polymerization processes in liquid monomer or in the gas phase.

To avoid deposit formation in the reactor, supported catalyst systems in which the metallocene and/or the aluminum compound serving as cocatalyst are fixed to an inorganic support material have been proposed.

EP-A-0,576,970 discloses metallocenes and corresponding supported catalyst systems.

However, a frequent problem in the industrial use of supported catalyst systems is the leaching of the metallocene component from the support material, which results, for example, in undesirable deposit formation in the reactor.

It is an object of the present invention to find novel catalyst systems in which the metallocene component can be firmly fixed to the support and cannot be leached from the support material under industrially relevant polymerization conditions.

We have found that this object is achieved by catalyst systems comprising at least one specifically substituted metallocene which contains a cationic group as substituent.

The present invention provides a catalyst system comprising a) at least one support,
b) at least one cocatalyst and
c) at least one metallocene of the formula (I)

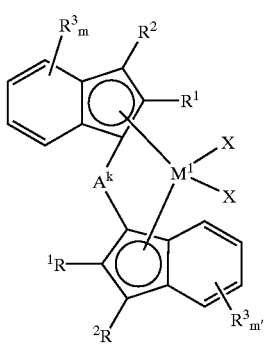

(I)

where $M^1$ is a transition metal of Group 4 of the Periodic Table of the Elements, for example titanium, zirconium or hafnium, preferably zirconium, $R^1$ and $R^2$ are identical or different and are each a hydrogen atom, a $C_1-C_{20}$ group, preferably a $C_1-C_{20}$-alkyl group, a $C_6-C_{14}$-aryl group, a $C_2-C_{20}$-alkenyl group, a $C_2-C_{20}$-alkynyl group, or a $C_7-C_{20}$-alkylaryl group, each of which may bear one or more identical or different halogen atoms as substituents, a halogen atom, an —$SiMe_3$ group or an $OSiMe_3$ group, particularly preferably hydrogen, methyl, ethyl, n-propyl, isopropyl, n-butyl, sec-butyl, isobutyl, tert-butyl, n-pentyl, branched pentyl, n-hexyl, branched hexyl, cyclohexyl or benzyl, $R^3$ are identical or different and are each a hydrogen atom or a $C_1-C_{40}$ group, preferably a $C_1-C_{20}$-alkyl group which may be substituted, in particular methyl, ethyl, trifluoroethyl, n-propyl, isopropyl, n-butyl, sec-butyl, isobutyl, tert-butyl, pentyl, hexyl, octyl, cyclopropyl, cyclopentyl or cyclohexyl, a $C_6-C_{14}$-aryl group which may be substituted, for example phenyl, tolyl, xylyl, tert-butylphenyl, ethylphenyl, trifluoromethylphenyl, bis(trifluoromethyl)phenyl, methoxyphenyl, fluorophenyl, dimethylaminophenyl, trimethylammoniumphenyl iodide, dimethylsulfoniumphenyl bromide, triethylphosphoniumphenyl triflate, naphthyl, acenaphthyl, phenanthrenyl or anthracenyl, a $C_2-C_{20}$-alkenyl group, a $C_2-C_{20}$-alkynyl group, a $C_7-C_{20}$-alkylaryl group, a halogen atom, an $SiMe_3$ group, an $OSiMe_3$ group or a $C_1-C_{20}$-heterocyclic group which may be substituted, where the term heteroatom encompasses all elements with the exception of carbon and hydrogen and preferably refers to an atom of group 14, 15 or 16 of the Periodic Table of the Elements, and two radicals $R^3$ may form a monocyclic or polycyclic ring system which may in turn be substituted, where at least one of the radicals $R^1$, $R^2$, $R^3$ is a cationic group (—$DE_L$)$^+Y^-$, where D is an atom of group 15 or 16 of the Periodic Table of the Elements, preferably nitrogen, phosphorus, oxygen or sulfur, E are identical or different and are each a hydrogen atom, a $C_1-C_{20}$ group, preferably a $C_1-C_{20}$-alkyl group, a $C_6-C_{14}$-aryl group, a $C_2-C_{20}$-alkenyl group, a $C_2-C_{20}$-alkynyl group or a $C_7-C_{20}$-alkylaryl group, a trialkylsilyl group, a triarylsilyl group or an alkylarylsilyl group, which may each be substituted, and two radicals E may form a monocyclic or polycyclic ring system which may in turn be substituted, particularly preferably a hydrogen atom, methyl, ethyl, propyl, butyl, allyl, benzyl, methoxymethyl, benzyloxymethyl, 2-methoxyethoxymethyl, 2-trimethylsilylethoxymethyl or trimethylsilyl, L is 3 when D is an atom of group 15 of the Periodic Table of the Elements and is 2 when D is an atom of group 16 of the Periodic Table of the Elements, Y is halogen, $C_1-C_{10}$-alkylsulfonate, $C_1-C_{10}$-haloalkylsulfonate, $C_6-C_{20}$-arylsulfonate, $C_6-C_{20}$-haloarylsulfonate, $C_7-C_{20}$-alkylarylsulfonate, $C_1-C_{20}$-haloalkylcarboxylate, $C_1$–$C_{10}$-alkylsulfate, tetrafluoroborate, hexafluorophosphate, hexafluoroantimonate or hexafluoroarsenate, preferably chloride, bromide, iodide, triflate, mesylate, tosylate, benzenesulfonate, trifluoroacetate, methyl sulfate, tetrafluoroborate or hexafluorophosphate, m is an integer less than or equal to 4 and greater than or equal to 1, preferably 1 or 2, particularly preferably 1, m' is an integer less than or equal to 4 and greater than or equal to 1, preferably 1 or 2, particularly preferably 1, k is zero or 1, with the metallocene being unbridged when k=0 and the metallocene being bridged when k=1, A is a bridge of the formula

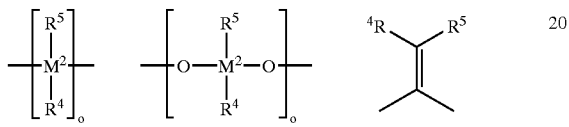

or =$BR^4$, $AlR^4$, —S—, —SO—, —$SO_2$—, =$NR^4$, =$PR^4$, =$P(O)R^4$, o-phenylene or 2,2'-biphenylene, where $M^2$ is carbon, silicon, germanium, tin, nitrogen or phosphorus, preferably carbon, silicon or germanium, in particular carbon or silicon, o is 1, 2, 3 or 4, preferably 1 or 2, $R^4$ and $R^5$ are identical or different and are each, independently of one another, a hydrogen atom, halogen, a $C_1$–$C_{20}$ group, preferably a $C_1$–$C_{20}$-alkyl, in particular methyl, a $C_6$–$C_{14}$-aryl, in particular phenyl or naphthyl, a $C_1$–$C_{10}$-alkoxy, a $C_2$–$C_{10}$-alkenyl, a $C_7$–$C_{20}$-arylalkyl, a $C_7$–$C_{20}$-alkylaryl, a $C_6$–$C_{10}$-aryloxy, a $C_1$–$C_{10}$-fluoroalkyl, a $C_6$–$C_{10}$-haloaryl, a $C_2$–$C_{10}$-alkynyl, a $C_3$–$C_{20}$-alkylsilyl, in particular trimethylsilyl, triethylsilyl or tert-butyldimethylsilyl, a $C_3$–$C_{20}$-arylsilyl, in particular triphenylsilyl, or a $C_3$–$C_{20}$-alkylarylsilyl, in particular dimethylphenylsilyl, diphenylsilyl or diphenyl-tert-butylsilyl, and $R^4$ and $R^5$ may form a monocyclic or polycyclic ring system.

A is preferably dimethylsilanediyl, dimethylgermanediyl, ethylidene, methylethylidene, 1,1-dimethylethylidene, 1,2-dimethylethylidene, tetramethylethylidene, isopropylidene, phenylmethylmethylidene or diphenylmethylidene, particularly preferably dimethylsilanediyl or ethylidene.

The radicals X are identical or different and are each a hydrogen atom, a halogen atom such as fluorine, chlorine, bromine or iodine, a hydroxyl group, a $C_1$–$C_{10}$-alkyl group such as methyl, ethyl, propyl, isopropyl, n-butyl, isobutyl, sec-butyl, tert-butyl, hexyl or cyclohexyl, a $C_6$–$C_{15}$-aryl group such as phenyl or naphthyl, a $C_1$–$C_{10}$-alkoxy group such as methoxy, ethoxy or tert-butoxy, a $C_6$–$C_{15}$-aryloxy group or a benzyl group, preferably a chlorine atom, a fluorine atom, a methyl group or a benzyl group, particularly preferably a chlorine atom or a methyl group.

Particularly preferred metallocenes of the formula (I) have the formula (I*),

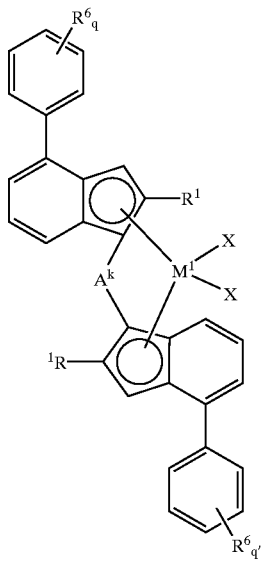

where $M^1$, A, $R^1$, k and X are as defined for formula (I) and $R^6$ are identical or different and are each a hydrogen atom or a $C_1$–$C_{40}$ group, preferably a $C_1$–$C_{20}$-alkyl group which may be substituted, in particular methyl, ethyl, trifluoromethyl, trifluoroethyl, n- propyl, isopropyl, n-butyl, sec-butyl, isobutyl, tert-butyl, pentyl, hexyl, octyl, cyclopropyl, cyclopentyl or cyclohexyl, a $C_6$–$C_{14}$-aryl group which may be substituted, in particular phenyl, a $C_2$–$C_{20}$-alkynyl group, a $C_7$–$C_{20}$-alkylaryl group, halogen, an $OR^4$ group, an $SiR^4_3$ group, an $NR^4_2$ group or an $SR^4$ group, and two radicals $R^4$ and $R^6$, each or together, may form a monocyclic or polycyclic ring system which may in turn be substituted, where $R^4$ is as defined for formula (I), and at least one of the radicals $R^6$ bears a cationic group (—$DE_L$)$^+Y^-$, where D, E, L and Y are as defined for formula (I), q is an integer less than or equal to 5 and greater than or equal to 1, preferably 1 or 2, particularly preferably 1, q' is an integer less than or equal to 5 and greater than or equal to 1, preferably 1 or 2, particularly preferably 1.

Illustrative but nonrestrictive examples of novel metallocenes of the formula (I) are:

dimethylsilanediylbis(2-methyl-4-(4'-trimethylammoniumphenyl)indenyl)dichlorozirconium diiodide dimethylsilanediylbis(2-methyl-4-(4'-trimethylammoniumphenyl)indenyl)dichlorotitanium diiodide dimethylsilanediylbis(2-methyl-4-(4'-trimethylammoniumphenyl)indenyl)dichlorohafnium diiodide dimethylsilanediylbis(2-methyl-4-(3'-trimethylammoniumphenyl)indenyl)dichlorozirconium diiodide dimethylsilanediylbis(2-methyl-4-(2'-trimethylammoniumphenyl)indenyl)dichlorozirconium diiodide dimethylsilanediylbis(2-methyl-4-(3',5'-bis(trimethylammonium)phenyl)indenyl)dichlorozirconium tetraiodide dimethylsilanediylbis(2-methyl-4-(4'-trimethylammoniumnaphthyl)indenyl)dichlorozirconium diiodide dimethylsilanediylbis(2-methyl-4-(4'-trimethylammoniumphenyl)indenyl)dichlorozirconium ditosylate dimethylsilanediylbis(2-ethyl-4-(4'-trimethylammoniumphenyl)indenyl)dichlorozirconium ditriflate dimethylsilanediylbis(2-methyl-4-(4'-dimethylammoniumphenyl)indenyl)dichlorozirconium dichloride dimethylsilanediylbis(2-methyl-4-(4'-trimethylammoniumphenyl)indenyl)dichlorozirconium bistetrafluoroborate dimethylsilanediylbis(2-methyl-4-(4'-N-methyl-N-pyrrolidinophenyl)indenyl)dichlorozirconium diiodide dimethylsilanediylbis(2-methyl-4-(4'-dimethylammoniumphenyl)indenyl)dichlorotitanium dichloride dimethylsilanediylbis(2-methyl-4-(4'-dimethyl(methoxymethyl)ammoniumphenyl)indenyl)dichlorozirconium dichloride dimethylsilanediylbis(2-methyl-4-(4'-dimethyl(2"-methoxyethoxymethyl)ammonium phenyl)indenyl)dichlorozirconium dichloride dimethylsilanediylbis(2-methyl-4-(4'-dimethyl(benzyloxymethyl)ammoniumphenyl)indenyl)dichlorozirconium dichloride dimethylsilanediylbis(2-methyl-4-(4'-dimethyl-(2"-trimethylsilylethoxymethyl)ammoniumphenyl)indenyl)dichlorohafnium dichloride dimethylsilanediylbis(2-methyl-4-(4'-dimethylbenzylammoniumphenyl)indenyl)dichlorozirconium dichloride dimethylsilanediylbis(2-methyl-4-(4'-dimethylallylammoniumphenyl)indenyl)dichlorozirconium diiodide dimethylsilanediylbis(2-methyl-4-(4'-triethylammoniumphenyl)indenyl)dichlorozirconium diiodide dimethylsilanediylbis(2-ethyl-4-(4'-dimethyl-(2"-trimethylsilylethoxymethyl)ammoniumphenyl)indenyl)dichlorohafnium dichloride dimethylsilanediylbis(2-ethyl-4-(4'-dimethylbenzylammoniumphenyl)indenyl)dichlorozirconium dichloride dimethylsilanediylbis(2-ethyl-4-(4'-dimethylallylammoniumphenyl)indenyl)dichlorozirconium diiodide dimethylsilanediylbis(2-ethyl-4-(4'-trimethylammoniumphenyl)indenyl)dichlorozirconium diiodide dimethylsilanediylbis(2-n-butyl-4-(4'-trimethylammoniumphenyl)indenyl)dichlorozirconium diiodide dimethylsilanediylbis(2-isopropyl-4-(4'-triethylammoniumphenyl)indenyl)dichlorozirconium dibromide dimethylsilanediylbis(2-isobutyl-4-(4'-triethylammoniumphenyl)indenyl)dichlorozirconium ditriflate dimethylsilanediylbis(2-ethyl-4-(4'-triethylphosphoniumphenyl)indenyl)dichlorozirconium diiodide dimethylsilanediylbis(2-methyl-4-(4'-dimethylsulfoniumphenyl)indenyl)dichlorozirconium dibromide dimethylsilanediylbis(2-ethyl-4-(4'-dimethylsulfoniumphenyl)indenyl)dichlorozirconium dibromide dimethylsilanediylbis(2-methyl-4-(3'-dimethylsulfoniumphenyl)indenyl)dichlorozirconium dibromide dimethylsilanediylbis(2-methyl-4-(2'-dimethylsulfoniumphenyl)indenyl)dichlorozirconium dibromide dimethylsilanediylbis(2-methyl-4-(3',5'-bis(dimethylsulfonium)phenyl)indenyl)dichlorozirconium tetrabromide dimethylsilanediylbis(2-methyl-4-(4'-dibenzylsulfoniumphenyl)indenyl)dichlorozirconium dibromide dimethylsilanediylbis(2-methyl-4-(4'-methyl(methoxymethyl)sulfoniumphenyl)indenyl)dichlorozirconium dichloride dimethylsilanediylbis(2-methyl-4-(4'-diallylsulfoniumphenyl)indenyl)dichlorozirconium dibromide dimethylsilanediylbis(2-methyl-4-(3'-diphenylethylphosphoniumphenyl)indenyl)dichlorozirconium diiodide dimethylsilanediylbis(2-methyl-4-(3'-trimethylphosphoniumphenyl)indenyl)dichlorozirconium ditriflate methylphenylsilanediylbis(2-isobutyl-4-(4'-triethylammoniumphenyl)indenyl)dichlorozirconium ditosylate 1,2-ethanediylbis(2-methyl-4-(3'-dimethylammoniumphenyl)indenyl)dichlorozirconium bistrifluoroacetate 1,2-ethanediylbis(2-methyl-4-(4'-dimethylsulfoniumphenyl)indenyl)dichlorozirconium dibromide 1,2-ethanediylbis(2-methyl-4-(3'-diphenylethylphosphoniumphenyl)indenyl)dichlorozirconium diiodide dimethylsilanediylbis(2-methyl-5-trimethylammoniumindenyl)dichlorozirconium dichloride dimethylsilanediylbis(2-methyl-5-trimethylphosphoniumindenyl)dichlorozirconium dichloride 1,2-ethanediylbis(2-methyl-4-dimethylbenzy,ammoniumindenyl)dichlorozirconium dibromide 1,2-ethanediylbis(2-methyl-4-phenyl-5-dimethylbenzylammoniumindenyl)dichlorozirconium dibromide dimethylsilanediylbis(2-methyl-4-phenyl-6-trimethylammoniumindenyl)dichlorozirconium dichloride dimethylsilanediylbis(2-methyl-5-dimethylsulfoniumindenyl)dichlorozirconium dibromide dimethylsilanediylbis(2-methyl-4-(4'-(2"-trimethylammoniumethyl)phenylindenyl)dichlorozirconium dichloride dimethylsilanediylbis(2-methyl-4-(4'-(3"-dimethylsulfoniumpropyl)phenylindenyl)dichlorozirconium diiodide dimethylsilanediylbis(2-methyl-4-(3'-(2"-trimethylammoniumethyl)phenylindenyl) dichlorozirconium dichloride dimethylsilanediylbis(2-methyl-4-(2'-trimethylammoniumethyl)indenyl)dichlorozirconium dichloride dimethylsilanediylbis(2-(2'-trimethylammoniumethyl)indenyl)dichlorozirconium dichloride dimethylsilanediylbis(2-(2'-trimethylammoniumethyl)-4-phenylindenyl)dichlorozirconium dibromide dimethylsilanediylbis(2-(2'-dimethylsulfoniumethyl)-4,6-dimethylindenyl)dichlorozirconium diiodide The catalyst system of the present invention comprises at least one cocatalyst (component b). The cocatalyst component which may, according to the present invention, be present in the catalyst system comprises at least one compound such as an aluminoxane or a Lewis acid or an ionic compound which reacts with a metallocene to convert it into a cationic compound.

As aluminoxane, preference is given to using a compound of the formula II $$(R\ AlO)_p \quad (II).$$

Aluminoxanes may be, for example, cyclic as in formula (III)

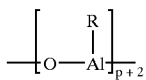
(III)

or linear as in formula (IV)

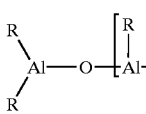
(IV)

or of the cluster type as in formula (V), as are described in the literature (JACS 117 (1995), 6465–74, Organometallics 13 (1994), 2957–2969).

The radicals R in the formulae (II), (III), (IV) and (V) may be identical or different and may be a $C_1$–$C_{20}$-hydrocarbon group preferably a $C_1$–$C_6$-alkyl group, a $C_6$–$C_{18}$-aryl group or benzyl, or hydrogen, and p is an integer from 2 to 50, preferably from 10 to 35.

The radicals R are preferably identical and are methyl, isobutyl, n-butyl, phenyl or benzyl, particularly preferably methyl.

If the radicals R are different, they are preferably methyl and hydrogen, methyl and isobutyl or methyl and n-butyl, where hydrogen or isobutyl or n-butyl are preferably present in a proportion of 0.01–40% (number of radicals R).

The aluminoxane can be prepared in various ways by known methods. One of the methods is, for example, reacting an aluminum-hydrocarbon compound and/or a hydridoaluminum-hydrocarbon compound with water (gaseous, solid, liquid or bound-for example as water of crystallization) in an inert solvent (e.g. toluene). To prepare an aluminoxane having different alkyl groups R, two different trialkylaluminums ($AlR_3 + AlR'_3$) corresponding to the desired composition and reactivity are reacted with water (cf. S. Pasynkiewicz, Polyhedron 9 (1990) 429 and EP-A-0,302,424).

Regardless of the method of preparation, all aluminoxane solutions have a variable content of unreacted aluminum starting compound which is present in free form or as adduct.

As Lewis acid, preference is given to using at least one organoboron or organoaluminum compound containing $C_1$–$C_{20}$ groups such as branched or unbranched alkyl or haloalkyl, e.g. methyl, propyl, isopropyl, isobutyl or trifluoromethyl, unsaturated groups such as aryl or haloaryl, e.g. phenyl, tolyl, benzyl, p-fluorophenyl, 3,5-difluorophenyl, pentachlorophenyl, pentafluorophenyl, 3,4,5-trifluorophenyl or 3,5-di(trifluoromethyl)phenyl.

Examples of Lewis acids are trimethylaluminum, triethylaluminum, triisobutylaluminum, tributylaluminum, trifluoroborane, triphenylborane, tris(4-fluorophenyl)borane, tris(3,5-difluorophenyl)borane, tris(4-fluoromethylphenyl)borane, tris(pentafluorophenyl) borane, tris(tolyl)borane, tris(3,5-dimethylphenyl)borane, tris(3,5-difluorophenyl)borane and/or tris(3,4,5-trifluorophenyl)borane. Very particular preference is given to tris (pentafluorophenyl)borane.

As ionic cocatalysts, preference is given to using compounds which contain a noncoordinating anion, for example tetrakis(pentafluorophenyl)borates, tetraphenylborates, $SbF_6$—, $CF_3SO_3$— or $ClO_4$—. As cationic counterion, use is made of Lewis bases such as methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, p-nitro-N,N-dimethylaniline, triethylphosphine, triphenylphosphine, diphenylphosphine, tetrahydrothiophene and triphenylcarbenium.

Examples of such ionic compounds which can be used according to the invention are triethylammonium tetra(phenyl)borate
tributylammonium tetra(phenyl)borate
trimethylammonium tetra(tolyl)borate
tributylammonium tetra(tolyl)borate
tributylammonium tetra(pentafluorophenyl)borate
tributylammonium tetra(pentafluorophenyl)aluminate
tripropylammonium tetra(dimethylphenyl)borate
tributylammonium tetra(trifluoromethylphenyl)borate
tributylammonium tetra(4-fluorophenyl)aborate
N,N-dimethylanilinium tetra(phenyl)borate
N,N-diethylanilinium tetra(phenyl)borate
N,N-dimethylanilinium tetrakis(pentafluorophenyl)borate
N,N-dimethylanilinium tetrakis(pentafluorophenyl) aluminate
di(propyl)ammonium tetrakis(pentafluorophenyl)borate
di(cyclohexyl)ammonium tetrakis(pentafluorophenyl) borate
triphenylphosphonium tetrakis(phenyl)borate
triethylphosphonium tetrakis(phenyl)borate
diphenylphosphonium tetrakis(phenyl)borate
tri(methylphenyl)phosphonium tetrakis(phenyl)borate
tri(dimethylphenyl)phosphonium tetrakis(phenyl)borate
triphenylcarbenium tetrakis(pentafluorophenyl)borate
triphenylcarbenium tetrakis(pentafluorophenyl)aluminate
triphenylcarbenium tetrakis(phenyl)aluminate
ferrocenium tetrakis(pentafluorophenyl)borate and/or
ferrocenium tetrakis(pentafluorophenyl)aluminate.

Preference is given to triphenylcarbenium tetrakis (pentafluorophenyl)borate and/or N,N-dimethylanilinium tetrakis(pentafluorophenyl)borate.

It is also possible to use mixtures of at least one Lewis acid and at least one ionic compound.

Cocatalyst components which are likewise of importance are borane or carborane compounds such as 7,8-dicarbaundecaborane(13),
undecahydrido-7,8-dimethyl-7,8-dicarbaundecaborane,
dodecahydrido-1-phenyl-1,3-dicarbanonaborane,
tri(butyl)ammonium undecahydrido-8-ethyl-7,9-dicarbaundecaborate,
4-carbanonaborane(1 4),
bis(tri(butyl)ammonium) nonaborate,
bis(tri(butyl)ammonium) undecaborate,
bis(tri(butyl)ammonium) dodecaborate,
bis(tri(butyl)ammonium) decachlorodecaborate,
tri(butyl)ammonium 1-carbadecaborate,
tri(butyl)ammonium 1-carbadodecaborate,
tri(butyl)ammonium 1-trimethylsilyl-1-carbadecaborate,
tri(butyl)ammonium bis(nonahydrido-1,3-dicarbanonaborato)cobaltate(III),
tri(butyl)ammonium bis(undecahydrido-7,8-dicarbaundecaborato)ferrate(III).

The support component (component a) of the catalyst system of the present invention can be any organic or inorganic, inert solid, preferably a porous support such as talc, inorganic oxides and finely divided polymer powders (e.g. polyolefins).

Suitable inorganic oxides may be found among the oxides of elements of groups 2, 3, 4, 5, 13, 14, 15 and 16 of the Periodic Table of the Elements. Examples of oxides preferred as supports include silicon dioxide, aluminum oxide and also mixed oxides of the two elements and corresponding oxide mixtures. Other inorganic oxides which can be used alone or in combination with the abovementioned preferred oxidic supports are, for example, MgO, $ZrO_2$, $TiO_2$ or $B_2O_3$, to name only a few.

The support materials used have a specific surface area in the range from 10 to 1000 $m^2$/g, a pore volume in the range from 0.1 to 5 ml/g and a mean particle size from 1 to 500 $\mu$m. Preference is given to supports having a specific surface area in the range from 50 to 500 $\mu$m, a pore volume in the range from 0.5 to 3.5 ml/g and a mean particle size in the range from 5 to 350 $\mu$m. Particular preference is given to supports having a specific surface area in the range from 200 to 400 $m^2$/g, a pore volume in the range from 0.8 to 3.0 ml/g and a mean particle size of from 10 to 200 $\mu$m.

If the support material used naturally has a low moisture content or residual solvent content, dehydration or drying before use can be omitted. If this is not the case, as when using silica gel as support material, dehydration or drying is advisable. Thermal dehydration or drying of the support material can be carried out under reduced pressure and simultaneous inert gas blanketing (e.g. nitrogen). The drying temperature is in the range from 100 to 1000° C., preferably from 200 to 800° C. The parameter pressure is not critical in this case. The duration of the drying process can be from 1 to 24 hours. Shorter or longer drying times are possible, provided that equilibrium with the hydroxyl groups on the support surface can be established under the conditions chosen, which normally takes from 4 to 8 hours.

The support material can also be dehydrated or dried by chemical means, by reacting the adsorbed water and the hydroxyl groups on the surface with suitable passivating agents. Reaction with the passivating reagent can convert all or some of the hydroxyl groups into a form which leads to no negative interaction with the catalytically active centers. Suitable passivating agents are, for example, silicon halides and silanes, e.g. silicon tetrachloride, chlorotrimethylsilane, dimethylaminotrichlorosilane, or organometallic compounds of aluminum, boron and magnesium, for example trimethylaluminum, triethylaluminum, triisobutylaluminum, triethylborane, dibutylmagnesium. Chemical dehydration or passivation of the support material is carried out, for example, by reacting a suspension of the support material in a suitable solvent with the passivating reagent in pure form or as a solution in a suitable solvent with exclusion of air and moisture. Suitable solvents are, for example, aliphatic or aromatic hydrocarbons such as pentane, hexane, heptane, toluene or xylene. Passivation is carried out at from 25° C. to 120° C., preferably from 50 to 70° C. Higher and lower temperatures are possible. The reaction time is from 30 minutes to 20 hours, preferably from 1 to 5 hours. After chemical dehydration is complete, the support material is isolated by filtration under inert conditions, washed one or more times with suitable inert solvents as have been described above and subsequently dried in a stream of inert gas or under reduced pressure.

Organic support materials such as finely divided polyolefin powders (e.g. polyethylene, polypropylene or polystyrene) can also be used and should likewise be freed of adhering moisture, solvent residues or other impurities by appropriate purification and drying operations before use.

The metallocenes used according to the present invention can be obtained by reacting a metallocene of the formula (Ia) with a reagent EY.

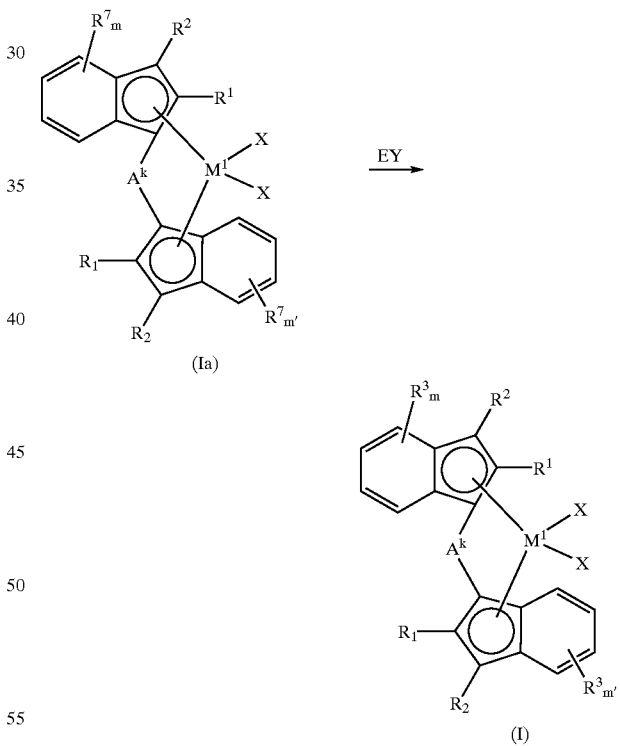

The radicals $R^1$, $R^2$, $R^3$, A, $M^1$, X, E, Y, k, m and m' are defined as for formula (I), and $R^7$ are identical or different and are each a hydrogen atom or a $C_1$–$C_{40}$ group, for example a $C_1$–$C_{20}$-alkyl group which may be substituted, for example methyl, ethyl, trifluoroethyl, n-propyl, isopropyl, n-butyl, sec-butyl, isobutyl, tert-butyl, pentyl, hexyl, octyl, cyclopropyl, cyclopentyl or cyclohexyl, a $C_6$–$C_{14}$-aryl group which may be substituted, for example phenyl, tolyl, xylyl, tert-butylphenyl, ethylphenyl, trifluoromethylphenyl, bis(trifluoromethyl)phenyl, methoxyphenyl, fluorophenyl, dimethylaminophenyl, methylthiophenyl, diethylphosphinophenyl, naphthyl, acenaphthyl, phenanthrenyl or anthracenyl, a $C_2$–$C_{20}$-alkenyl group, a $C_2$–$C_{20}$-alkynyl group, a $C_7$–$C_{20}$-alkylaryl group, a halogen atom, an $SiMe_3$ group, an $OSiMe_3$ group or a $C_1$–$C_{20}$-heterocyclic group, which may be substituted, where the term heteroatom refers to all elements with the exception of carbon and hydrogen and is preferably an atom of group 14, 15 or 16 of the Periodic Table of the Elements, and two radicals $R^7$ may form a monocyclic or polycyclic ring system which may in turn be substituted, and in the metallocenes of the formula (Ia), at least one of the radicals $R^1$, $R^2$, $R^7$ bears or is a group $DE_{L-1}$, where D is an atom of group 15 or 16 of the Periodic Table of the Elements, in particular nitrogen, phosphorus, oxygen or sulfur, and E and L are as defined for formula (I).

Metallocenes of the formula (Ia) are prepared by methods known from the literature (e.g. EP 576 970 A1; Chem. Left., 1991, 11, p.2047 ff; Journal of Organometallic Chem., 288 (1985) 63–67 and documents cited there).

The reagent EY is a compound capable of transferring a radical E, where E and Y are as defined for formula (I).

Illustrative but nonrestrictive examples of the reagent EY are: methyl iodide, methyl bromide, methyl chloride, methyl triflate, methyl trifluoroacetate, methyl methanesulfonate, methyl p-toluenesulfonate, dimethyl sulfate, trimethyloxonium tetrafluoroborate, trimethyloxonium hexafluorophosphate, ethyl iodide, ethyl bromide, ethyl chloride, triethyloxonium tetrafluoroborate, triethyloxonium hexafluorophosphate, propyl iodide, propyl bromide, propyl triflate, butyl bromide, butyl iodide, butyl chloride, pentyl bromide, octyl bromide, benzyl chloride, benzyl bromide, benzyl triflate, allyl bromide, allyl chloride, p-methoxybenzyl chloride, trimethylsilyl chloride, trimethylsilyl bromide, trimethylsilyl iodide, trimethylsilyl triflate, tert-butyldimethylsilyl chloride, tert-butyidimethylsilyl triflate, triphenylsilyl chloride, triphenylsilyl iodide, triphenylsilyl triflate, methoxymethyl chloride (MOMCl), 2-methoxyethoxymethyl chloride (MEMCl), 2-trimethylsilylethoxymethyl chloride (SEMCl), benzyloxymethyl chloride (BOMCl), hydrogen fluoride, hydrogen chloride, hydrogen bromide, hydrogen iodide, trifluoroacetic acid, methanesulfonic acid, trifluoromethanesulfonic acid, p-toluenesulfonic acid, sulfuric acid, perchloric acid, acetic acid, triethylamine hydrochloride, trimethylamine hydrofluoride, tetrafluoroboric acid diethyl etherate and hexafluorophosphoric acid.

The process of the present invention can be carried out in the presence of a suitable solvent or in bulk. Nonrestrictive examples of suitable solvents are hydrocarbons which may be halogenated, e.g. benzene, toluene, xylene, mesitylene, ethylbenzene, chlorobenzene, dichlorobenzene, fluorobenzene, decalin, pentane, hexane, cyclohexane, dichloromethane, chloroform, tetrachloromethane, 1,2-dichloroethane or trichloroethylene, ethers such as diethyl ether, di-n-butyl ether, MTBE, THF, DME, anisole, triglyme or dioxane, amides such as DMF, dimethylacetamide or NMP, sulfoxides such as DMSO, phosphoramides such as hexamethylphosphoramide, urea derivatives such as DMPU, ketones such as acetone or ethyl methyl ketone, esters such as ethyl acetate, nitriles such as acetonitrile and also any mixtures of these.

The process of the present invention is generally carried out at from −100° C. to +500° C., preferably from −78° C. to +200° C., particularly preferably from 0° C. to 100° C.

The reaction can be carried out in a single-phase system or in a multiphase system.

The molar ratio of reagent EY to metallocene (Ia) is generally in the range from 0.5 to 100, preferably from 1 to 10.

The concentration of metallocene (Ia) or of reagent EY in the reaction mixture is generally in the range from 0.001 mol/l to 8 mol/l, preferably in the range from 0.01 to 3 mol/l, particularly preferably in the range from 0.1 mol/l to 2 mol/l.

The duration of the reaction of metallocenes of the formula (Ia) with a reagent EY is generally in the range from 5 minutes to 1 week, preferably in the range from 15 minutes to 48 hours.

The catalyst system of the present invention may, if desired, further comprise additional additive components. It is also possible to use mixtures of two or more metallocene compounds of the formula (I) or mixtures of metallocene compounds of the formula (I) with other metallocenes or semisandwich compounds, e.g. for preparing polyolefins having a broad or multimodal molar mass distribution.

The catalyst system of the present invention is prepared by mixing at least one metallocene of the formula (I), at least one cocatalyst and at least one passivated support.

To prepare the supported catalyst system, at least one of the above-described metallocene components in a suitable solvent is brought into contact with at least one cocatalyst component, preferably giving a soluble reaction product, an adduct or a mixture.

The composition obtained in this way is then mixed with the dehydrated or passivated support material, the solvent is removed and the resulting supported metallocene catalyst system is dried to ensure that the solvent is completely or mostly removed from the pores of the support material. The supported catalyst is obtained as a free-flowing powder.

A process for preparing a free-flowing and, if desired, prepolymerized supported catalyst system comprises the following steps:

a) Preparation of a metallocene/cocatalyst mixture in a suitable solvent or suspension medium, where the metallocene component has one of the above-described structures, b) Application of the metallocene/cocatalyst mixture to a porous, preferably inorganic dehydrated support, c) Removal of the major part of the solvent from the resulting mixture, d) Isolation of the supported catalyst system, e) If desired, prepolymerization of the supported catalyst system obtained using one or more olefinic monomer(s) in order to obtain a prepolymerized supported catalyst system.

Preferred solvents for the preparation of the metallocene/cocatalyst mixture are hydrocarbons and hydrocarbon mixtures which are liquid at the reaction temperature chosen and in which the individual components preferably dissolve. However, the solubility of the individual components is not a prerequisite, as long as it is ensured that the reaction product of metallocene and cocatalyst component is soluble in the solvent chosen. Examples of suitable solvents include alkanes such as pentane, isopentane, hexane, heptane, octane and nonane; cycloalkanes such as cyclopentane and cyclohexane; and aromatics such as benzene, toluene, ethylbenzene and diethylbenzene. Very particular preference is given to toluene.

The amounts of aluminoxane and metallocene used in the preparation of the supported catalyst system can be varied over a wide range. Preference is given to setting a molar ratio of aluminum to transition metal in the metallocene of from 10:1 to 1000:1, very particularly preferably from 50:1 to 500:1. In the case of methylaluminoxane, preference is given to using 30% strength solutions in toluene, but the use of 10% strength solutions is also possible.

For preactivation, the metallocene in the form of a solid is dissolved in a solution of the aluminoxane in a suitable solvent. It is also possible to dissolve the metallocene separately in a suitable solvent and subsequently to combine this solution with the aluminoxane solution. Preference is given to using toluene.

The preactivation time is from 1 minute to 200 hours.

The preactivation can take place at room temperature (25° C.). The use of higher temperatures may in some cases shorten the preactivation time required and effect an additional increase in the activity. In this case, higher temperature means a temperature in the range from 50 to 100° C.

The preactivated solution or the metallocene/cocatalyst mixture is subsequently combined with an inert support material, usually silica gel, which is in the form of a dry powder or as a suspension in one of the abovementioned solvents. The support material is preferably used as powder. The order of addition is immaterial. The preactivated metallocene/cocatalyst solution or the metallocene/cocatalyst mixture can be added to the support material, or else the support material can be introduced into the solution.

The volume of the preactivated solution or the metallocene/cocatalyst mixture can exceed 100% of the total pore volume of the support material used or else can be up to 100% of the total pore volume.

The temperature at which the preactivated solution or the metallocene/cocatalyst mixture is brought into contact with the support material can vary in a range from 0 to 100° C. However, lower or higher temperatures are also possible.

Subsequently, the solvent is completely or mostly removed from the supported catalyst system, during which the mixture can be stirred and, if desired, also heated. Preference is given to removing both the visible proportion of the solvent and also the proportion in the pores of the support material. Removal of the solvent can be carried out in a conventional way using reduced pressure and/or flushing with inert gas. In the drying procedure, the mixture can be heated until the free solvent has been removed, which usually takes from 1 to 3 hours at a preferably selected temperature in the range from 30 to 60° C. The free solvent is the visible proportion of solvent in the mixture. For the purposes of the present invention, residual solvent is the proportion which is enclosed in the pores.

As an alternative to complete removal of the solvent, the supported catalyst system can also be dried only to a certain residual solvent content, with the free solvent having been completely removed. The supported catalyst system can subsequently be washed with a low-boiling hydrocarbon such as pentane or hexane and dried again.

The supported catalyst system prepared according to the present invention can either be used directly for the polymerization of olefins or be prepolymerized using one or more olefinic monomers before use in a polymerization process. The prepolymerization procedure for supported catalyst systems is described, for example, in WO 94/28034.

As additive, a small amount of olefin, preferably an α-olefin (for example styrene or phenyldimethylvinylsilane), as activity-increasing component or, for example, an antistatic (as described in U.S. Ser. No. 08/365280) can be added during or after the preparation of the supported catalyst system. The molar ratio of additive to metallocene component compound I is preferably from 1:1000 to 1000:1, very particularly preferably from 1:20 to 20:1.

The present invention also describes a process for preparing a polyolefin by polymerization of one or more olefins in the presence of the catalyst system of the present invention comprising at least one transition metal component of the formula (I). For the purposes of the present invention, the term polymerization encompasses both homopolymerization and copolymerization.

Preference is given to polymerizing olefins of the formula $R_m$—CH=CH—$R_n$, where $R_m$ and $R_n$ are identical or different and are each a hydrogen atom or an organic radical having from 1 to 20 carbon atoms, in particular from 1 to 10 carbon atoms, and $R_m$ and $R_n$ together with the atoms connecting them can form one or more rings.

Examples of such olefins are 1-olefins having 2–40 carbon atoms, preferably from 2 to 10 carbon atoms, e.g. ethene, propene, 1-butene, 1-pentene, 1-hexene, 4-methyl-1-pentene or 1-octene, styrene, dienes such as 1,3-butadiene, 1,4-hexadiene, vinylnorbornene, norbornadiene or ethylnorbornadiene, and cyclic olefins such as norbornene, tetracyclododecene or methylnorbornene. In the process of the present invention, preference is given to homopolymerizing propene or ethene or copolymerizing propene with ethene and/or with one or more 1-olefins having from 4 to 20 carbon atoms, e.g. hexene, and/or one or more dienes having from 4 to 20 carbon atoms, e.g. 1,4-butadiene, norbornadiene, ethylidenenorbornene or ethyinorbornadiene. Examples of such copolymers are ethene-propene copolymers or ethene-propene-1,4-hexadiene terpolymers.

The polymerization is carried out at from −60 to 300° C., preferably from 50 to 200° C., very particularly preferably 50–80° C. The pressure is from 0.5 to 2000 bar, preferably from 5 to 64 bar.

The polymerization can be carried out in solution, in bulk, in suspension or in the gas phase, continuously or batchwise, in one or more stages.

The catalyst system prepared according to the present invention can be used as sole catalyst component for the polymerization of olefins having from 2 to 20 carbon atoms, but is preferably used in combination with at least one alkyl compound of an element of main groups I to III of the Periodic Table, e.g. an aluminum alkyl, magnesium alkyl or lithium alkyl or an aluminoxane. The alkyl compound is added to the monomer or suspension medium and serves to free the monomer of substances which can adversely affect the catalyst activity. The amount of alkyl compound added depends on the quality of the monomers used.

If necessary, hydrogen is added as molar mass regulator and/or to increase the activity.

In addition, an antistatic can be metered into the polymerization system during the polymerization, either together with or separately from the catalyst system used.

The polymers prepared using the catalyst system of the present invention display a uniform particle morphology and contain no fines. No deposits or caked material occur in the polymerization using the catalyst system of the present invention.

The catalyst system of the present invention gives polymers, e.g. polypropylene, having extraordinarily high stereospecificity and regiospecificity.

A particularly characteristic parameter for the stereospecificity and regiospecificity of polymers, in particular polypropylene, is the triad tacticity (TT) and the proportion of 2-1-inserted propene units (RI) which can both be determined from the $^{13}C$-NMR spectra.

The $^{13}C$-NMR spectra are measured at elevated temperature (365 K) in a mixture of hexachlorobutadiene and $d_2$-tetrachloroethane. The resonance signal of $d_2$-tetrachloroethane ($\delta$=73.81 ppm) is used as internal reference for all the $^{13}C$-NMR spectra of the polypropylene samples measured.

To determine the triad tacticity of polypropylene, the methyl resonance signals in the $^{13}$C-NMR spectrum from 23 to 16 ppm are examined; cf. J. C. Randall, Polymer Sequence Determination: Carbon-13 NMR Method, Academic Press New York 1978; A. Zambelli, P. Locatelli, G. Bajo, F. A. Bovey, Macromolecules 8 (1975), 687–689; H. N. Cheng, J. A. Ewen, Makromol. Chem. 190 (1989), 1931–1943. Three successive 1-2-inserted propene units whose methyl groups are arranged on the same side in the "Fischer Projection" are referred to as mm triads ($\delta$=21.0 ppm to 22.0 ppm). If only the second methyl group of the three successive propene units points to the other side, one speaks of an rr triad ($\delta$=19.5 ppm to 20.3 ppm), and if only the third methyl group of the three successive propene units points to the other side, of an mr triad ($\delta$=20.3 ppm to 21.0 ppm). The triad tacticity is calculated using the following formula:

$$TT(\%)=mm/(mm+mr+rr)\cdot 100$$

If a propene unit is inserted inversely into the growing polymer chain, this is referred to as a 2-1 insertion; cf. T. Tsutsui, N. Ishimaru, A. Mizuno, A. Toyota, N. Kashiwa, Polymer 30 (1989), 1350–56. The following different structural arrangements are possible:

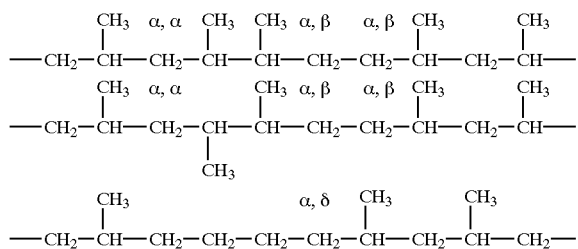

The proportion of 2-1-inserted propene units (RI) can be calculated using the following formula:

$$RI(\%)=0.5I\alpha,\beta(I\alpha,\alpha+I\alpha,\beta+I\alpha,\delta)\cdot 100,$$

where

I$\alpha,\alpha$ is the sum of the intensities of the resonance signals at $\delta$=41.84, 42.92 and 46.22 ppm, I$\alpha,\beta$ is the sum of the intensities of the resonance signals at $\delta$=30.13, 32.12, 35.11 and 35.57 ppm and I$\alpha,\delta$ is the intensity of the resonance signal at $\delta$=37.08 ppm.

The isotactic polypropylene which has been prepared using the catalyst system of the present invention has a proportion of 2-1-inserted propene units RI of <0.5% at a triad tacticity TT>98.0%, and the $M_w/M_n$ of the polypropylene prepared according to the present invention is from 2.5 to 3.5.

The copolymers which can be prepared using the catalyst system of the present invention have a significantly higher molar mass than those of the prior art. At the same time, such copolymers can be prepared with high productivity using industrially relevant process parameters without deposit formation by using the catalyst system of the present invention.

The invention is illustrated by the following examples which do not, however, restrict the scope of the invention.

General procedures: Preparation and handling of the organometallic compounds was carried out with exclusion of air and moisture under argon (Schlenk technique or glove box). All solvents required were purged with argon and dried over molecular sieves before use.

EXAMPLE 1

Dimethylsilanediylbis(2-methyl-4-(4'-trimethylammoniumphenyl)indenyl) dichlorozirconium Diiodide (1)

4.5 g (0.02 mol) of 2-methyl-7-bromo-1-indanone, 3.63 g (0.022 mol) of 4-N,N-dimethylaminophenylboronic acid and 4.66 g (0.044 mol) of sodium carbonate together with a mixture of 80 ml of 1,2-dimethoxyethane and 25 ml of water were placed in a reaction vessel, degassed a number of times and saturated with argon. 90 mg (0.4 mmol) of palladium acetate and 0.2 g (0.8 mmol) of triphenylphosphine were added and the reaction mixture was stirred for 3 hours at 80° C. After addition of 100 ml of water, the mixture was extracted with diethyl ether, the combined organic phases were washed with water and dried over magnesium sulfate. Removal of the solvent and column filtration through neutral aluminum oxide (dichloromethane) gave 5.1 g of 2-methyl-7-(4'-N,N-dimethylaminophenyl)-1-indanone.

$^1$H-NMR (300 MHz, CDCl$_3$): 7.58–7.24 (m, 5H), 6.78 (d, 2H), 3.38 (m, 1H), 3.01 (s, 6H), 2.78–2.65 (m, 2H), 1.28 (d, 2H).

760 mg (20 mmol) of sodium borohydride were added at 0° C. to a solution of 5.0 g (0.019 mol) of 2-methyl-7-(4'-N,N-dimethylaminophenyl)-1-indanone in 100 ml of THF/methanol (2:1), and the mixture was stirred at room temperature for 18 hours. The reaction mixture was poured into ice water, treated with concentrated hydrochloric acid until the pH was 1, then brought to pH 9 using 2 M sodium hydroxide solution and extracted a number of times with dichloromethane. The combined organic phases were washed with water and with sodium chloride solution and dried over magnesium sulfate. Removal of the solvent gave the crude 2-methyl-7-(4'-N,N-dimethylaminophenyl)-1-indanol product which was taken up in 100 ml of toluene. After addition of 3.1 g (0.027 mol) of trifluoroacetic acid, the mixture was stirred at 100° C. for 2 hours. 2 M sodium hydroxide solution was subsequently added until the pH was 9, the phases were separated and the solvent was removed. 4.6 g of 2-methyl-4-(4'-N,N-dimethylaminophenyl)indene were isolated.

$^1$H-NMR (300 MHz, CDCl$_3$): 7.46–7.21 (m, 5H), 6.86–6.81 (m, 2H), 6.72 (s, 1H) 3.36 (s, 2H), 3.05 (s, 6H), 2.15 (s, 3H).

A solution of 10.0 g (40.2 mmol) of 2-methyl-4-(4'-dimethylaminophenyl)indene in 100 ml of toluene and 5 ml of THF was admixed at room temperature with 16.7 ml (44 mmol) of a 20% strength solution of butyllithium in toluene and heated at 80° C. for 2 hours. The suspension was subsequently cooled to 0° C. and admixed with 2.76 g (21 mmol) of dimethyldichlorosilane. The reaction mixture was heated at 80° C. for another 1 hour and subsequently washed with 50 ml of water. The solvent was removed under reduced pressure and the residue was recrystallized from heptane at –20° C. This gave 7.8 g of ligand as colorless crystals. 5.0 g (9 mmol) of the ligand were dissolved in 70 ml of diethyl ether, admixed at room temperature with 6.84 ml (18 mmol) of a 20% strength solution of butyllithium in toluene and subsequently refluxed for 3 hours. The solvent was removed under reduced pressure and the residue was filtered together with 50 ml of hexane through a G3 Schlenk frit, washed with 50 ml of hexane and dried (0.1 mbar, 20° C.). The dilithium salt was added at –78° C. to a suspension of 2.2 g (9.5 mmol) of zirconium tetrachloride in 50 ml of methylene chloride and warmed to room temperature over a period of 18 hours while stirring. The mixture was filtered through a G3 frit and the residue was extracted with a total of 400 ml of methylene chloride introduced a little at a time. The combined filtrates were largely freed of the solvent under reduced pressure. The crystalline solid which precipitated from methylene chloride was separated off. 3.8 g of metallocene were obtained as a mixture of the racemic and meso forms in a ratio of 1:1. Renewed recrystallization from methylene chloride gave 1.4 g of the racemic complex in the form of yellow crystals.

$^1$H-NMR (300 MHz, CDCl$_3$): 7.62–7.00 (m, 10H), 6.88–6.76 (m, 6H), 2.95 (s, 12H), 2.42 (s, 6H), 1.18 (s, 6H).

A solution of 1.0 g (1.4 mmol) of dimethylsilanediylbis (2-methyl-4-(4'-N,N-dimethylaminophenyl)indenyl) zirconium dichloride in a mixture of 15 ml of toluene and 15 ml of THF was admixed with 7.95 g (5.6 mmol) of methyl iodide and the mixture was stirred at 45° C. for 3 hours. The reaction mixture was subsequently evaporated to dryness and the residue was washed with a little toluene and pentane, giving 1.29 g of dimethylsilanediylbis(2-methyl-4-(4'-trimethylammoniumphenyl)indenyl)dichlorozirconium diiodide(1) as a yellow-orange solid.

$^1$H-NMR (300 MHz, DMSO-d6): 7.70–7.05 (m, 10H), 6.89–6.79 (m, 6H), 3.51 (s, 18H), 2.49 (s, 6H), 1.21 (s, 6H).

EXAMPLE 2

Dimethylsilanediylbis(2-methyl-4-(4'-dimethylsulfoniumphenyl)indenyl) dichlorozirconium Dibromide (2)

The preparation of dimethylsilanediylbis(2-methyl-4-(4'-methylthiophenyl)indenyl)zirconium dichloride was carried out in a manner similar to Example 1. This was subsequently reacted with methyl bromide using a method analogous to Example 1 to give (2).

EXAMPLE 3

Dimethylsilanediylbis(2-methyl-4-(3'-diphenylethylphosphoniumphenyl)indenyl) dichlorozirconium Diiodide (3)

The preparation of dimethylsilanediylbis(2-methyl-4-(3'-diphenylphosphinophenyl)indenyl)zirconium dichloride was carried out in a manner similar to Example 1. This was subsequently reacted with ethyl iodide using a method analogous to Example 1 to give (3).

EXAMPLE 4

Dimethylsilanediylbis(2-methyl-4-(4'-dimethylammoniumphenyl)indenyl) dichlorozirconium dichloride (4)

The preparation of dimethylsilanediylbis(2-methyl-4-(4'-dimethylaminophenyl)indenyl)zirconium dichloride was carried out in a manner similar to Example 1. This was subsequently reacted at 0° C. with two equivalents of hydrogen chloride solution in THF to give (4).

EXAMPLE 5

Dimethylsilanediylbis(2-methyl-4-(4'-dimethyl (methoxymethyl)ammoniumphenyl)indenyl) dichlorozirconium Dichloride (5)

The preparation of dimethylsilanediylbis(2-methyl-4-(4'-dimethyl(methoxymethyl)ammoniumphenyl)indenyl) zirconium dichloride was carried out in a manner similar to Example 1. It was subsequently reacted with methoxymethyl chloride (MOMCl) using a method analogous to Example 1 to give (5).

EXAMPLE 6

1,2-Ethanediylbis(2-methyl-4-(3'-dimethylammoniumphenyl)indenyl) dichlorozirconium Bistrifluoroacetate (6)

The preparation of dimethylsilanediylbis(2-methyl-4-(3'-dimethylammoniumphenyl)indenyl)zirconium dichloride was carried out in a manner similar to Example 1 using 1,2-dibromoethane in the ligand synthesis. It was subsequently reacted at 0° C. with two equivalents of trifluoroacetic acid to give (6).

EXAMPLE 7

Dimethylsilanediylbis(2-methyl-4-(4'-dimethyl-(2"-trimethylsilylethoxymethyl)ammoniumphenyl) indenyl)dichlorohafnium Dichloride (7)

The preparation of dimethylsilanediylbis(2-methyl-4-(4'-dimethyl(2"-trimethylsilylethoxymethyl)ammoniumphenyl) indenyl)hafnium dichloride was carried out in a manner similar to Example 1 using hafnium tetrachloride in the synthesis of the complex. It was subsequently reacted with 2-trimethylsilylethoxymethyl chloride (SEMCl) using a method analogous to Example 1 to give (7).

Polymerization Examples

Preparation of the Supported Catalyst System 0.092 mmol of the appropriate metallocene was mixed with 4.3 ml of 30% strength MAO solution (20 mmol) in toluene and a further 1.9 ml of toluene and stirred at room temperature for 1 hour while being protected from light. 4 g of SiO$_2$ were then added while stirring and, after the addition was complete, the mixture was stirred for another 10 minutes. Removal of the solvent in an oil pump vacuum gave a free-flowing powder.

Polymerization

A dry 16 dm$^3$ reactor was flushed firstly with nitrogen and subsequently with propylene and charged with 10 dm$^3$ of liquid propylene. 0.5 cm$^3$ of a 20% strength triisobutylaluminum solution in Varsol diluted with 30 cm$^3$ of Exxsol was then introduced into the reactor and the mixture was stirred at 30° C. for 15 minutes. The appropriate catalyst suspension of 2 g of the supported metallocene catalyst in 20 cm$^3$ of Exxsol was subsequently introduced into the reactor. The reaction mixture was then heated to 60° C. (4° C./min) and the polymerization system was held at 60° C. for 1 hour by cooling. The polymerization was stopped by venting and the polymer obtained was dried under reduced pressure.

The polymerization results are shown in the following table.

| Metallocene | Yield [kg of PP] | Activity [kg of PP/g of cat/h] | Remarks |
| --- | --- | --- | --- |
| 1 | 2.0 | 1.0 | no deposit formation polymerization occurred heterogeneously |

-continued

| Metallocene | Yield [kg of PP] | Activity [kg of PP/g of cat/h] | Remarks |
|---|---|---|---|
| 2 | 1.8 | 0.9 | no deposit formation polymerization occurred heterogeneously |

We claim:

1. A catalyst system comprising
   a) at least one support
   b) at least one cocatalyst and
   c) at least one metallocene of the formula (I)

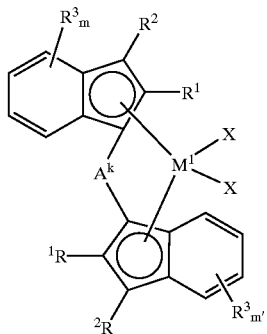

(I)

where
M$^1$ is a transition metal of Group 4 of the Periodic Table of the Elements,
R$^1$ and R$^2$ are identical or different and are each a hydrogen atom, a halogen atom or a C$_1$–C$_{20}$ group,
R$^3$ are identical or different and are each a hydrogen atom, a halogen atom or a C$_1$–C$_{40}$ group, and two groups R$^3$ may form a monocyclic or polycyclic ring system which may in turn be substituted, where at least one of the groups R$^1$, R$^2$, R$^3$ bears or is a cationic group (—DE$_L$)$^+$Y$^-$, where
D is an atom of group 15 or 16 of the Periodic Table of the Elements,
E are identical or different and are each a hydrogen atom or a C$_1$–C$_{20}$ group, and two groups E may form a monocyclic or polycyclic ring system which may in turn be substituted,
L is 3 when D is an atom of group 15 of the Periodic Table of the Elements and is 2 when D is an atom of group 16 of the Periodic Table of the Elements,
Y is halogen, C$_1$–C$_{10}$-alkylsulfonate, C$_1$–C$_{10}$-haloalkylsulfonate, C$_6$–C$_{20}$-arylsulfonate, C$_6$–C$_{20}$-haloarylsulfonate, C$_7$–C$_{20}$-alkylarylsulfonate, C$_1$–C$_{20}$-haloalkylcarboxylate, C$_1$–C$_{10}$-alkylsulfate, tetrafluoroborate, hexafluorophosphate, hexafluoroantimonate or hexafluoroarsenate,
m is an integer less than or equal to 4 and greater than or equal to 1,
m' is an integer less than or equal to 4 and greater than or equal to 1,
k is zero or 1, with the metallocene being unbridged when k=0 and the metallocene being bridged when k=1, A is a bridge of the formula

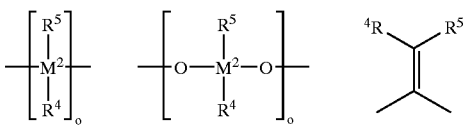

or =BR$^4$, A$^{IR_4}$, —S—, —SO—, —SO$_2$—, =NR$_4$, =PR$_4$, =P(O)R$_4$, o-phenylene or 2,2'-biphenylene,
where
M$^2$ is carbon, silicon, germanium, tin, nitrogen or phosphorus,
o is 1, 2, 3 or 4,
R$^4$ and R$^5$ are identical or different and are each, independently of one another, a hydrogen atom, halogen or a C$_1$–C$_{20}$ group and R$^4$ and R$^5$ may form a monocyclic or polycyclic ring system,
X are identical or different and are each a hydrogen atom, a halogen atom, a hydroxyl group, a C$_1$–C$_{10}$-alkyl group, a C$_6$–C$_{15}$-aryl group, a C$_1$–C$_{10}$-alkoxy group, a C$_6$–C$_{15}$-aryloxy group or a benzyl group.

2. A catalyst system as claimed in claim 1, wherein, in formula (I),
M$_1$ is titanium, zirconium or hafnium,
R$_1$ and R$^2$ are identical or different and are each a C$_1$–C$_{20}$-alkyl group, a C$_6$–C$_{14}$-aryl group, a C$_2$–C$_{20}$-alkenyl group, a C$_2$–C$_{20}$-alkynyl group, a C$_7$–C$_{20}$-alkylaryl group, each of which groups may bear one or more, identical or different halogen atoms as substituents, or R$^1$ and R$^2$ are each a hydrogen atom, a halogen atom, an —SiMe$_3$ group, or an OSiMe$_3$ group,
R$^3$ are identical or different and are each a hydrogen atom, a C$_1$–C$_{20}$-alkyl group which may be substituted, a C$_6$–C$_{14}$-aryl group which may be substituted, a C$_2$–C$_{20}$-alkenyl group, a C$_2$–C$_{20}$-alkynyl group, a C$_7$–C$_{20}$-alkylaryl group, a halogen atom, an SiMe$_3$ group, an OSiMe$_3$ group or a C$_1$–C$_{20}$-heterocyclic group which may be substituted, where the term heteroatom encompasses all elements with the exception of carbon and hydrogen, and two groups R$^3$ may form a monocyclic or polycyclic ring system which may in turn be substituted, where at least one of the groups R$^1$, R$^2$, R$^3$ bears or is a cationic group (—DE$_L$)$^+$Y$^-$,
where
D is nitrogen, phosphorus, oxygen or sulfur,
E are identical or different and are each a hydrogen atom, a C$_1$–C$_{20}$-alkyl group, a C$_6$–C$_{14}$-aryl group, a C$_2$–C$_{20}$-alkenyl group, a C$_2$–C$_{20}$-alkynyl group, a C$_7$–C$_{20}$-alkylaryl group, a trialkylsilyl group, a triarylsilyl group or an alkylarylsilyl group, which may in turn be substituted, and two groups E may form a monocyclic or polycyclic ring system which may in turn be substituted,
L is 3 when D is an atom of group 15 of the Periodic Table of the Elements and is 2 when D is an atom of group 16 of the Periodic Table of the Elements,
Y is chloride, bromide, iodide, triflate, mesylate, tosylate, benzenesulfonate, trifluoroacetate, methyl sulfate, tetrafluoroborate or hexafluorophosphate,
m is 1 or 2,
m' is 1 or 2,
k is zero or 1, where the metallocene is unbridged when k=0 and the metallocene is bridged when k=1, A is a bridge of the formula

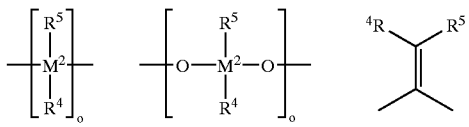

=BR⁴, A^{IR₄}, —S—, —SO—, —SO₂—, =NR₄, =PR₄, =P(O)R₄, o-phenylene, 2,2'-biphenylene, where $M^2$ is carbon, silicon or germanium, o is 1 or 2, $R^4$ and $R^5$ are identical or different and are each, independently of one another, a hydrogen atom, halogen, a $C_1$–$C_{20}$-alkyl, a $C_6$–$C_{14}$-aryl, a $C_1$–$C_{10}$-alkoxy, a $C_2$–$C_{20}$-alkenyl, a $C_7$–$C_{20}$-arylalkyl, a $C_7$–$C_{20}$-alkylaryl, a $C_6$–$C_{10}$-aryloxy, a $C_1$–$C_{10}$-fluoroalkyl, a $C_6$–$C_{10}$-haloaryl, a $C_2$–$C_{10}$-alkynyl, a $C_3$–$C_{20}$-alkylsilyl, a $C_3$–$C_{20}$-arylsilyl or a $C_3$–$C_{20}$-alkylarylsilyl, and $R^4$ and $R^5$ may form a monocyclic or polycyclic ring system.

3. A catalyst system as claimed in claim 1, wherein, in formula (I), $M^1$ is zirconium, $R^1$ and $R^2$ are identical or different and are each a hydrogen atom, methyl, ethyl, n-propyl, isopropyl, n-butyl, sec-butyl, isobutyl, tert-butyl, n-pentyl, branched pentyl, n-hexyl, branched hexyl, cyclohexyl or benzyl, $R^3$ are identical or different and are each a hydrogen atom, methyl, ethyl, trifluoroethyl, n-propyl, isopropyl, n-butyl, sec-butyl, isobutyl, tert-butyl, pentyl, hexyl, octyl, cyclopropyl, cyclopentyl, cyclohexyl, phenyl, tolyl, xylyl, tert-butylphenyl, ethylphenyl, trifluoromethylphenyl, bis(trifluoromethyl)phenyl, methoxyphenyl, fluorophenyl, dimethylaminophenyl, trimethylammoniumphenyl iodide, dimethylsulfoniumphenyl bromide, triethylphosphoniumphenyl triflate, naphthyl, acenaphthyl, phenanthrenyl, anthracenyl or a $C_1$–$C_{20}$-heterocyclic group which may be substituted, where the term heteroatom encompasses all elements with the exception of carbon and hydrogen, and two groups $R^3$ may form a monocyclic or polycyclic ring system which may in turn be substituted, where at least one of the groups $R^1$, $R^2$, $R^3$ bears or is a cationic group $(-DE_L)^+Y^-$, where D is nitrogen, phosphorus or sulfur, E are identical or different and are each a hydrogen atom, methyl, ethyl, propyl, butyl, allyl, benzyl methoxymethyl, benzyloxymethyl, 2-methoxyethoxymethyl, 2-trimethylsilylethoxymethyl or trimethylsilyl, L is 3 when D is an atom of group 15 of the Periodic Table of the Elements and is 2 when D is an atom of group 16 of the Periodic Table of the Elements, Y is chloride, bromide, iodide, triflate, mesylate, tosylate, benzenesulfonate, trifluoroacetate, methyl sulfate, tetrafluoroborate or hexafluorophosphate, m is 1, m' is 1, k is zero or 1, where the metallocene is unbridged when k=0 and the metallocene is bridged when k=1, A is a bridge of the formula

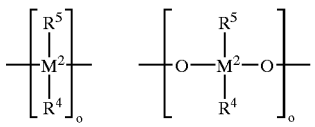

or =BR⁴, A^{IR₄}, —S—, —SO—, —SO₂—, =NR₄, =PR₄, =P(O)R₄, o-phenylene or 2,2'-biphenylene, where $M^2$ is carbon or silicon, o is 1 or 2, $R^4$ and $R^5$ are identical or different and are each, independently of one another, a hydrogen atom, halogen, methyl, phenyl or naphthyl, trimethylsilyl, triethylsilyl, tert-butyldimethylsilyl, triphenylsilyl, dimethylphenylsilyl, diphenylsilyl or diphenyl-tert-butylsilyl, and $R^4$ and $R^5$ may form a monocyclic or polycyclic ring system.

4. A catalyst system as claimed in claim 1, wherein, in formula (I), A is dimethylsilanediyl, dimethylgermanediyl, ethylidene, methylethylidene, 1,1-dimethylethylidene, 1,2-dimethylethylidene, tetramethylethylidene, isopropylidene, phenylmethylmethylidene or diphenylmethylidene.

5. A catalyst system as claimed in claim 1, wherein the metallocene has the formula (I*),

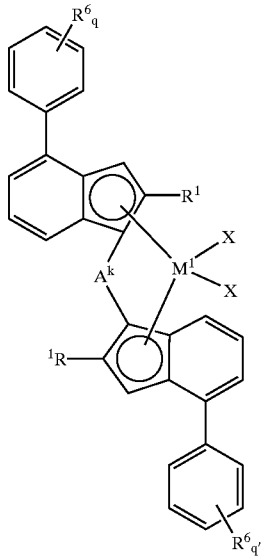

(I*)

where $M^1$, A, $R^1$, k and X are as defined for formula (I) and $R^6$ are identical or different and are each a hydrogen atom, a $C_1$–$C_{20}$-alkyl group which may be substituted, a $C_6$–$C_{14}$-aryl group which may be substituted, a $C_2$–$C_{20}$-alkynyl group, a $C_7$–$C_{20}$-alkylaryl group, halogen, an $OR^4$ group, an $SiR^4_3$ group, an $NR^4_2$ group or an $SR^4$ group, and two radicals $R^4$ and $R^6$, each or together, may form a monocyclic or polycyclic ring system which may in turn be substituted, where $R^4$ is as defined for formula (I), and at least one of the radicals $R^6$ bears a cationic group $(-DE_L)^+Y^-$, where D, E, L and Y are as defined for formula (I), q is an integer less than or equal to 5 and greater than or equal to 1, q' is an integer less than or equal to 5 and greater than or equal to 1.

6. A catalyst system as claimed in claim 5, wherein, in formula (I*), $R^6$ are identical or different and are each a hydrogen atom, methyl, ethyl, trifluoromethyl, trifluoroethyl, n-propyl, isopropyl, n-butyl, sec-butyl, isobutyl, tert-butyl, pentyl, hexyl, octyl, cyclopropyl, cyclopentyl, cyclohexyl or phenyl, and at least one of the radicals $R^6$ bears a cationic group ($-DE_L)^+Y^-$, where D, E, L and Y are as defined for formula (I), q is 1 or 2, q' is 1 or 2.

7. A catalyst system as claimed in claim 1, wherein formula (I) represents dimethylsilanediylbis(2-methyl-4-(4'-trimethylammoniumphenyl)indenyl)dichlorozirconium diiodide dimethylsilanediylbis(2-methyl-4-(4'-trimethylammoniumphenyl)indenyl)dichlorotitanium diiodide dimethylsilanediylbis(2-methyl-4-(4'-trimethylammoniumphenyl)indenyl)dichlorohafnium diiodide dimethylsilanediylbis(2-methyl-4-(3'-trimethylammoniumphenyl)indenyl)dichlorozirconium diiodide dimethylsilanediylbis(2-methyl-4-(2'-trimethylammoniumphenyl)indenyl)dichlorozirconium diiodide dimethylsilanediylbis(2-methyl-4-(3',5'-bis(trimethylammonium)phenyl)indenyl)dichlorozirconium tetraiodide dimethylsilanediylbis(2-methyl-4-(4'-trimethylammoniumnaphthyl)indenyl)dichlorozirconium diiodide dimethylsilanediylbis(2-methyl-4-(4'-trimethylammoniumphenyl)indenyl)dichlorozirconium ditosylate dimethylsilanediylbis(2-ethyl-4-(4'-trimethylammoniumphenyl)indenyl)dichlorozirconium ditriflate dimethylsilanediylbis(2-methyl-4-(4'-dimethylammoniumphenyl)indenyl)dichlorozirconium dichloride dimethylsilanediylbis(2-methyl-4-(4'-trimethylammoniumphenyl)indenyl)dichlorozirconium bistetrafluoroborate dimethylsilanediylbis(2-methyl-4-(4'-N-methyl-N-pyrrolidinophenyl)indenyl)dichlorozirconium diiodide dimethylsilanediylbis(2-methyl-4-(4'-dimethylammoniumphenyl)indenyl)dichlorotitanium dichloride dimethylsilanediylbis(2-methyl-4-(4'-dimethyl(methoxymethyl)ammoniumphenyl)indenyl)dichlorozirconium dichloride dimethylsilanediylbis(2-methyl-4-(4'-dimethyl(2"-methoxyethoxymethyl)ammoniumphenyl)indenyl)dichlorozirconium dichloride dimethylsilanediylbis(2-methyl-4-(4'-dimethyl(benzyloxymethyl)ammoniumphenyl)indenyl)dichlorozirconium dichloride dimethylsilanediylbis(2-methyl-4-(4'-dimethyl-(2"-trimethylsilylethoxymethyl)ammoniumphenyl)indenyl)dichlorohafnium dichloride dimethylsilanediylbis(2-methyl-4-(4'-dimethylbenzylammoniumphenyl)indenyl)dichlorozirconium dichloride dimethylsilanediylbis(2-methyl-4-(4'-dimethylallylammoniumphenyl)indenyl)dichlorozirconium diiodide dimethylsilanediylbis(2-methyl-4-(4'-triethylammoniumphenyl)indenyl)dichlorozirconium diiodide dimethylsilanediylbis(2-ethyl-4-(4'-dimethyl-(2"-trimethylsilylethoxymethyl)ammoniumphenyl)indenyl)dichlorohafnium dichloride dimethylsilanediylbis(2-ethyl-4-(4'-dimethylbenzylammoniumphenyl)indenyl)dichlorozirconium dichloride dimethylsilanediylbis(2-ethyl-4-(4'-dimethylallylammoniumphenyl)indenyl)dichlorozirconium diiodide dimethylsilanediylbis(2-ethyl-4-(4'-trimethylammoniumphenyl)indenyl)dichlorozirconium diiodide dimethylsilanediylbis(2-n-butyl-4-(4'-trimethylammoniumphenyl)indenyl)dichlorozirconium diiodide dimethylsilanediylbis(2-isopropyl-4-(4'-triethylammoniumphenyl)indenyl)dichlorozirconium dibromide dimethylsilanediylbis(2-isobutyl-4-(4'-triethylammoniumphenyl)indenyl)dichlorozirconium ditriflate dimethylsilanediylbis(2-ethyl-4-(4'-triethylphosphoniumphenyl)indenyl)dichlorozirconium diiodide dimethylsilanediylbis (2-methyl-4-(4'-dimethylsulfoniumphenyl)indenyl)dichlorozirconium dibromide dimethylsilanediylbis(2-ethyl-4-(4'-dimethylsulfoniumphenyl)indenyl)dichlorozirconium dibromide dimethylsilanediylbis(2-methyl-4-(3'-dimethylsulfoniumphenyl)indenyl)dichlorozirconium dibromide dimethylsilanediylbis(2-methyl-4-(2'-dimethylsulfoniumphenyl)indenyl)dichlorozirconium dibromide dimethylsilanediylbis(2-methyl-4-(3',5'-bis(dimethylsulfonium)phenyl)indenyl)dichlorozirconium tetrabromide dimethylsilanediylbis(2-methyl-4-(4'-dibenzylsulfoniumphenyl)indenyl)dichlorozirconium dibromide dimethylsilanediylbis(2-methyl-4-(4'-methyl(methoxymethyl)sulfoniumphenyl)indenyl)dichlorozirconium dichloride dimethylsilanediylbis(2-methyl-4-(4'-diallylsulfoniumphenyl)indenyl)dichlorozirconium dibromide dimethylsilanediylbis(2-methyl-4-(3'-diphenylethylphosphoniumphenyl)indenyl)dichlorozirconium diiodide dimethylsilanediylbis(2-methyl-4-(3'-trimethylphosphoniumphenyl)indenyl)dichlorozirconium ditriflate methylphenylsilanediylbis(2-isobutyl-4-(4'-triethylammoniumphenyl)indenyl)dichlorozirconium ditosylate 1,2-ethanediylbis(2-methyl-4-(3'-dimethylammoniumphenyl)indenyl)dichlorozirconium bistrifluoroacetate 1,2-ethanediylbis(2-methyl-4-(4'-dimethylsulfoniumphenyl)indenyl)dichlorozirconium dibromide 1,2-ethanediylbis(2-methyl-4-(3'-diphenylethylphosphoniumphenyl)indenyl)dichlorozirconium diiodide dimethylsilanediylbis(2-methyl-5-trimethylammoniumindenyl)dichlorozirconium dichloride dimethylsilanediylbis(2-methyl-5-trimethylphosphoniumindenyl)dichlorozirconium dichloride 1,2-ethanediylbis(2-methyl-4-dimethylbenzylammoniumindenyl)dichlorozirconium dibromide 1,2-ethanediylbis(2-methyl-4-phenyl-5-dimethylbenzylammoniumindenyl)dichlorozirconium dibromide dimethylsilanediylbis(2-methyl-4-phenyl-6-trimethylammoniumindenyl)dichlorozirconium dichloride dimethylsilanediylbis(2-methyl-5-dimethylsulfoniumindenyl)dichlorozirconium dibromide dimethylsilanediylbis(2-methyl-4-(4'-(2''-trimethylammoniummethyl)phenylindenyl)dichlorozirconium dichloride dimethylsilanediylbis(2-methyl-4-(4'-(3''-dimethylsulfoniumpropyl)phenylindenyl)dichlorozirconium diiodide dimethylsilanediylbis(2-methyl-4-(3'-(2''-trimethylammoniummethyl)phenylindenyl)dichlorozirconium dichloride dimethylsilanediylbis(2-methyl-4-(2'-trimethylammoniummethyl)indenyl)dichlorozirconium dichloride dimethylsilanediylbis(2-(2'-trimethylammoniummethyl)indenyl)dichlorozirconium dichloride dimethylsilanediylbis(2-(2'-trimethylammoniummethyl)-4-phenylindenyl)dichlorozirconium dibromide dimethylsilanediylbis(2-(2'-dimethylsulfoniummethyl)-4,6-dimethylindenyl)dichlorozirconium diiodide or a mixture thereof.

8. A process for preparing a polyolefin by polymerization of one or more olefins in the presence of a catalyst system as claimed in claim 1.

* * * * *

UNITED STATES PATENT AND TRADEMARK OFFICE
CERTIFICATE OF CORRECTION

PATENT NO.     : 6,583,238 B1
DATED          : June 24, 2003
INVENTOR(S)    : Goeres et al.

It is certified that error appears in the above-identified patent and that said Letters Patent is hereby corrected as shown below:

Column 21,
Line 9, before "=BR$^4$," insert -- or --

Signed and Sealed this

Thirtieth Day of September, 2003

JAMES E. ROGAN
*Director of the United States Patent and Trademark Office*